United States Patent
Dagrossa

(10) Patent No.: US 9,701,160 B2
(45) Date of Patent: Jul. 11, 2017

(54) COMPRESSIBLE TRACTION DEVICE

(71) Applicant: Darrin Dagrossa, Douglaston, NY (US)

(72) Inventor: Darrin Dagrossa, Douglaston, NY (US)

(*) Notice: Subject to any disclaimer, the term of this patent is extended or adjusted under 35 U.S.C. 154(b) by 50 days.

(21) Appl. No.: 14/880,368

(22) Filed: Oct. 12, 2015

(65) Prior Publication Data

US 2017/0100963 A1    Apr. 13, 2017

(51) Int. Cl.
*B60B 39/12*    (2006.01)
(52) U.S. Cl.
CPC .................... *B60B 39/12* (2013.01)
(58) Field of Classification Search
CPC ......... B60B 15/00; B60B 39/02; B60C 27/18; B60C 27/20
See application file for complete search history.

(56) References Cited

U.S. PATENT DOCUMENTS

| | | | |
|---|---|---|---|
| 1,218,767 A | 3/1917 | Heginbottom | |
| 1,606,622 A | 11/1926 | Fogarty | |
| 1,617,271 A | 2/1927 | Penfield | |
| 1,815,435 A | 7/1931 | Harding et al. | |
| 1,863,316 A | 6/1932 | Webster, Jr. | |
| 3,025,002 A | 3/1962 | Kunz | |
| 3,202,358 A | 8/1965 | Griswold | |
| 3,640,459 A | 2/1972 | Preisler | |
| 3,672,422 A | 6/1972 | Greipel | |
| 3,708,117 A * | 1/1973 | Coale | B60B 39/12 238/14 |
| 3,786,989 A | 1/1974 | Haynes | |
| 3,861,592 A | 1/1975 | Fisher | |
| 4,210,280 A * | 7/1980 | Reisner | B60B 39/12 238/14 |
| 4,265,399 A * | 5/1981 | Covington | B60B 39/12 238/14 |
| 4,281,791 A | 8/1981 | Schaaf et al. | |
| 4,300,722 A * | 11/1981 | Simmons | B60B 39/12 238/14 |
| 4,361,277 A | 11/1982 | Cannady et al. | |
| 4,840,309 A * | 6/1989 | Teresi | B60B 39/12 238/14 |
| 5,439,171 A * | 8/1995 | Fruend | B60B 39/12 152/208 |
| 6,394,362 B1 * | 5/2002 | Kramr | B60B 39/12 238/14 |

(Continued)

FOREIGN PATENT DOCUMENTS

WO    2005/042276 A1    5/2005

*Primary Examiner* — Jason C Smith
(74) *Attorney, Agent, or Firm* — Richard L Miller

(57) ABSTRACT

A traction device providing increased traction of a tire having a shape and being on a poor tractional surface, and widening under, and cupping to the shape of, the tire by compression to increase surface area engaging the poor tractional surface to increase weight distribution and the increased traction of the tire. The traction device includes a base and a top cover. The top cover is affixed to the base, and widens under, and cups to the shape of, the tire by the compression to increase the surface area engaging the poor tractional surface to increase the weight distribution and the increased traction of the tire on the poor tractional surface.

60 Claims, 6 Drawing Sheets

(56) References Cited

U.S. PATENT DOCUMENTS

| | | | |
|---|---|---|---|
| 6,520,420 B1* | 2/2003 | Singh | B60B 39/12 238/14 |
| 7,350,719 B1* | 4/2008 | Brenner | B60B 39/12 238/14 |
| 2013/0008072 A1 | 1/2013 | Chung | |
| 2014/0103131 A1* | 4/2014 | Nutzati | B60B 39/12 238/14 |
| 2014/0203095 A1* | 7/2014 | Shwartz | B60B 39/12 238/14 |
| 2015/0083815 A1* | 3/2015 | Moses | B60B 39/12 238/14 |
| 2016/0121653 A1* | 5/2016 | Letarte | B60B 39/00 238/14 |

* cited by examiner

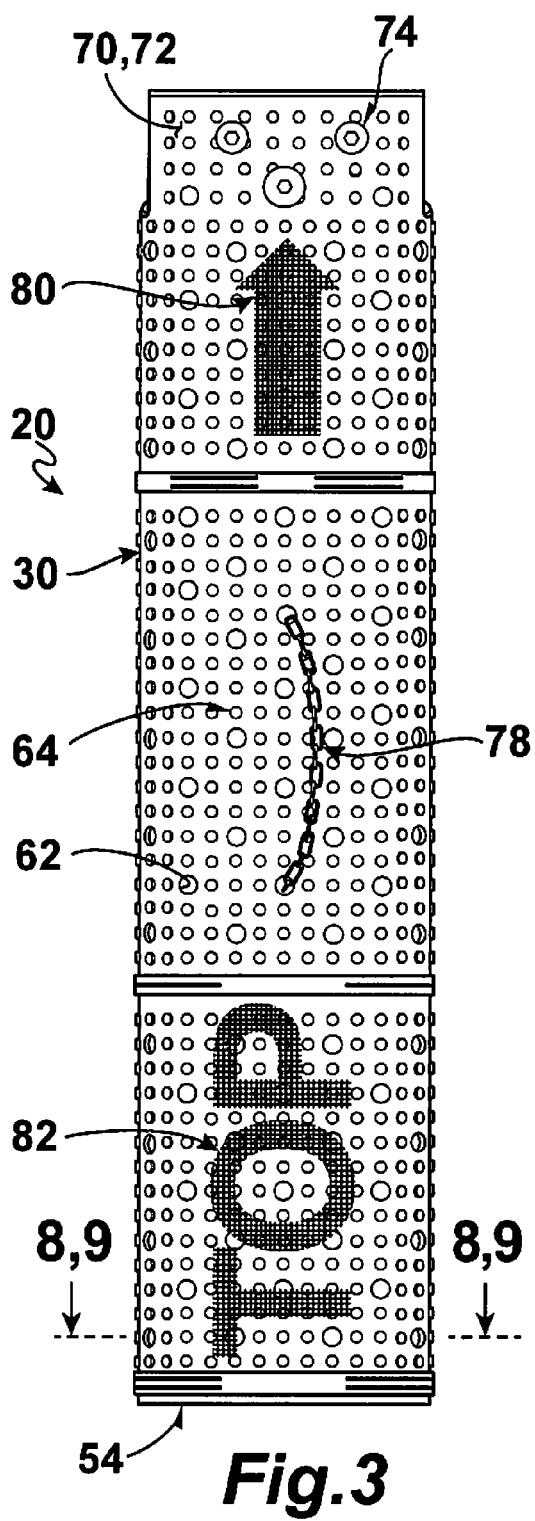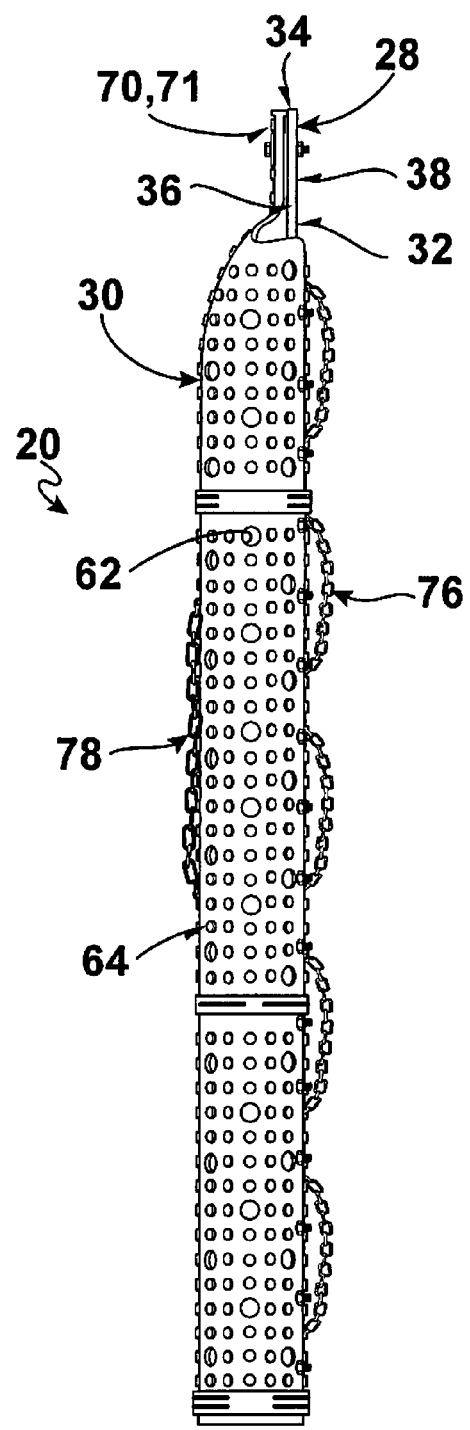

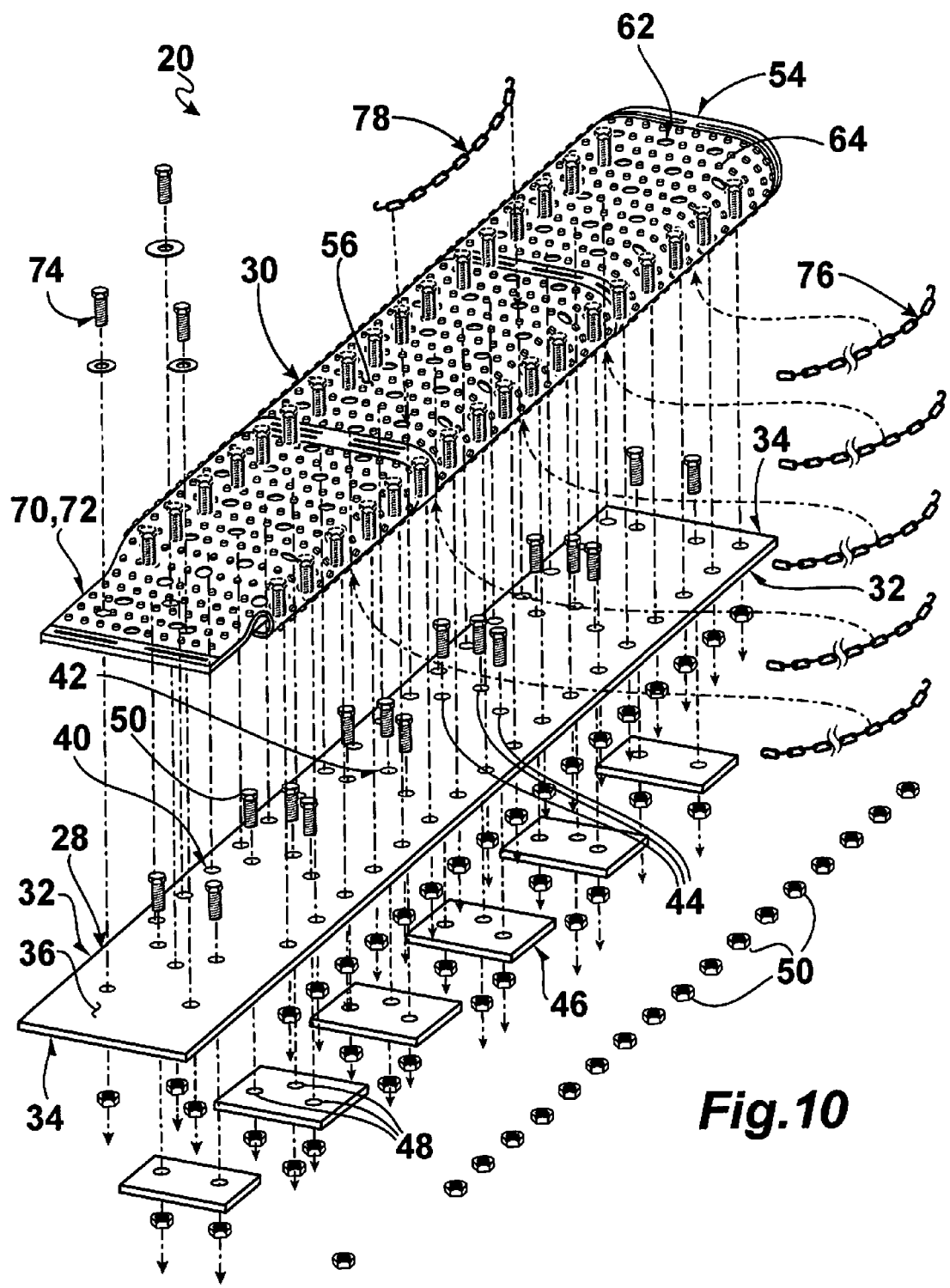

COMPRESSIBLE TRACTION DEVICE

BACKGROUND OF THE INVENTION

Field of the Invention

The present invention relates to a traction device, and more particularly, a compressible traction device.

Description of the Prior Art

Numerous innovations for vehicle traction devices have been provided in the prior art that will be described. Even though these innovations may be suitable for the specific individual purposes to which they address, however, they differ from the present invention.

A FIRST EXAMPLE, U.S. Pat. No. 1,815,435, Issued on Jul. 21, 1931, to Harding, et al. teaches a traction tread device including a substantially imperforate body of vulcanized rubber adapted to be placed between the tread of a driving wheel and the ground. The substantially imperforate body has projections on its under side adapted to indent soft or granular ground surface.

A SECOND EXAMPLE, U.S. Pat. No. 1,863,316, Issued on Jun. 14, 1932, to Webster, Jr. teaches a traction mat including a sheet metal shoe portion having a plurality of diagonally upwardly extending sharp projections. The shoe is sufficiently pliable to conform to the shape of a vehicle tire. Further included is a strip of flexible material having one of its ends secured to the shoe, and plurality of studs secured to the strip and projecting from the opposite sides thereof.

A THIRD EXAMPLE, U.S. Pat. No. 3,640,459, Issued on Feb. 8, 1972, to Preisler teaches a traction pad for an automotive vehicle having pneumatic tires, which includes a flat and flexible mat formed with transverse treads on its upper surface. Studs embedded in the mat extend out of the smooth bottom surface of the mat for engagement with a slippery roadway. The mat is rectangular, and has long beveled side edges and end edges to provide an incline on which the wheel rolls. Each stud has a cylindrical body with a reduced-diameter and cylindrical pin portion extending outwardly axially of one end thereof. Ridges are provided on the bottom surface between rows of protruding stud pin portions to cooperate with the studs in holding the mat in place on the roadway. The ridges elevate the pin portions from the carpet on the floor of the vehicle when the pad is stored thereover and being used as a mat thereupon. Drag lines are attached to an end of the mat.

A FOURTH EXAMPLE, U.S. Pat. No. 3,672,422, Issued on Jun. 27, 1972, to Greipel teaches a traction device for use with automotive vehicles to assist in extrication of the vehicle from ice, snow, sand, mud, or the like. The traction device includes a rigid or semi-rigid plate having an upper traction surface for engagement by the vehicle tire and having projecting members on the opposite surface adapted to bite or dig into the ice, snow, mud, or sand in which the vehicle is stuck. Flexible apparatus, such as chains, secured to the traction plate are provided for the purpose of firmly securing the traction mat to the vehicle tire at the interface with the material in which the vehicle is stuck. This causes the traction device to engage the tire temporarily, but firmly, for sufficient time to permit the traction plate to become firmly set into engagement with the ice, snow, mud, or sand. Thereupon, further engagement between the moving tire tread and the traction plate permits the vehicle to be readily extricated.

A FIFTH EXAMPLE, U.S. Pat. No. 3,786,989, Issued on Jan. 22, 1974, to Haynes teaches a traction mat for placement beneath the driving wheel of an automobile disabled on an ice- or snow-covered road. The mat includes an inexpensive, one-piece, an expendable elongate flat sheet of expanded metal, such as metal lath, having a substantially rectangular shape and characterized by a plurality of slit portions formed by transverse slits in the metal. The sheet has a pair of opposite and longitudinal edge or margin portions formed by cutting across the sheet. This normally would result in a plurality of sharp protrusions that are formed by the cutting. To prevent injury to the user and damage to surrounding objects from scratching by the protrusions, a plastic substance is applied to the sharp protrusions, preferably, by dipping the latter into a bath of plastic in a molten state and allowing the plastic substance to solidify, whereby the protrusions become coated with beads or globules of plastic.

A SIXTH EXAMPLE, U.S. Pat. No. 3,861,592, Issued on Jan. 21, 1975, to Fisher teaches a traction mat formed of injection-molded and thermoplastic material having formed therein a plurality of integral sleeves defining socket-like recesses extending transversely through the thickness of the material, being closed at one end and open at the other, and provided with metallic pins or studs frictionally secured in the sockets, and projecting from the open end for the purpose of engaging a road bed.

A SEVENTH EXAMPLE, U.S. Pat. No. 4,210,280, Issued on Jul. 1, 1980, to Reisner teaches a traction mat having a plurality of pins captivated in a resilient mat. Each pin has a head on each of the opposing ends and a washer between the head and the mat. The mat provides increased traction to a vehicle stuck in snow and the like by seizing both the tire and the ground with the heads of each pin in pivotal action as the washer pivots and locks the heads in a gripping position for the increased traction. A rigid steel start plate of a width less than the width of the tire is attached to one end of the mat for providing initial impetus to position the mat under the tire.

AN EIGHTH EXAMPLE, U.S. Pat. No. 4,281,791, Issued on Aug. 4, 1981, to Schaaf, et al. teaches a motor vehicle traction aid device including a plastic bag containing a sand mixture for insertion under a tire on a drive wheel of a motor vehicle for improving traction on ice, snow, or the like. The bag is partially filled with the sand material, and includes a foam or sponge rubber tab on one side. The bag is inserted between the driving surface and the tire of the motor vehicle so that the tab engages the tire. Rotation of the wheel toward the driving surface causes the tire to engage the tab drawing the bag and the sand material under the tire in a rolling action, bursting the bag, and dispensing the sand beneath the tire.

A NINTH EXAMPLE, U.S. Pat. No. 4,300,722, Issued on Nov. 17, 1981, to Simmons teaches a traction mat to aid vehicle wheels for driving out of ice, snow, mud, sand, and the like, which is an elongated, unitary, stamped, and metal structure that is generally rectangular and has a forward inwardly tapered end portion, with the mat including a plurality of upwardly extending flanges disposed at 90° with respect to the planer surface and a plurality of downwardly projecting V-shaped gripping lugs. The mat outer side edges are formed with trough-shaped ribs for stiffening and the upwardly extending flanges and downwardly shaped gripping lugs are provided with structurally formed ribbing to increase the rigidity for placement and use in a variety of terrains.

A TENTH EXAMPLE, U.S. Pat. No. 4,361,277, Issued on Nov. 30, 1982, to Cannady, et al. teaches a traction device for assisting vehicles when stuck in sand, snow, bog, or the like, which incorporates a rigid plate having opposed upper and lower gripping ribs and an appended chain structure having transverse angle-iron pieces spaced lengthwise thereof.

AN ELEVENTH EXAMPLE, U.S. Pat. No. 5,439,171, Issued on Aug. 8, 1995, to Fruend teaches a traction mat for vehicles, which has panels of flexible and resilient material interconnected by sets of overlapping links that enable the panels to be folded in a stacked arrangement. Recesses or slots in the upper faces of the panels provide grip for a vehicle's tires, and holes in the panel enable the panel to be pushed down through mud to a solid surface.

It is apparent now that numerous innovations for vehicle traction devices have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a compressible traction device that avoids the disadvantages of the prior art.

ANOTHER OBJECT of the present invention is to provide a compressible traction device that is simple and inexpensive to manufacture.

STILL ANOTHER OBJECT of the present invention is to provide a compressible traction device that is simple to use.

BRIEFLY STATED, STILL YET ANOTHER OBJECT of the present invention is to provide a traction device providing increased traction of a tire having a shape and being on a poor tractional surface, and widening under, and cupping to the shape of, the tire by compression to increase surface area engaging the poor tractional surface to increase weight distribution and the increased traction of the tire. The traction device includes a base and a top cover. The top cover is affixed to the base, and widens under, and cups to the shape of, the tire by the compression to increase the surface area engaging the poor tractional surface to increase the weight distribution and the increased traction of the tire.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows:

FIG. 3 is a top plan view thereof taken in the direction of arrow 3 in FIG. 2;

FIG. 4 is a right side elevational view thereof taken in the direction of arrow 4 in FIG. 2, it being understood that a left side elevational view is substantially a mirror image thereof;

FIG. 10 is a diagrammatic exploded perspective view showing all of the components required to fabricate an embodiment of the invention.

A MARSHALING OF REFERENCE NUMERALS UTILIZED IN THE DRAWING

Introductory

Figure 1:
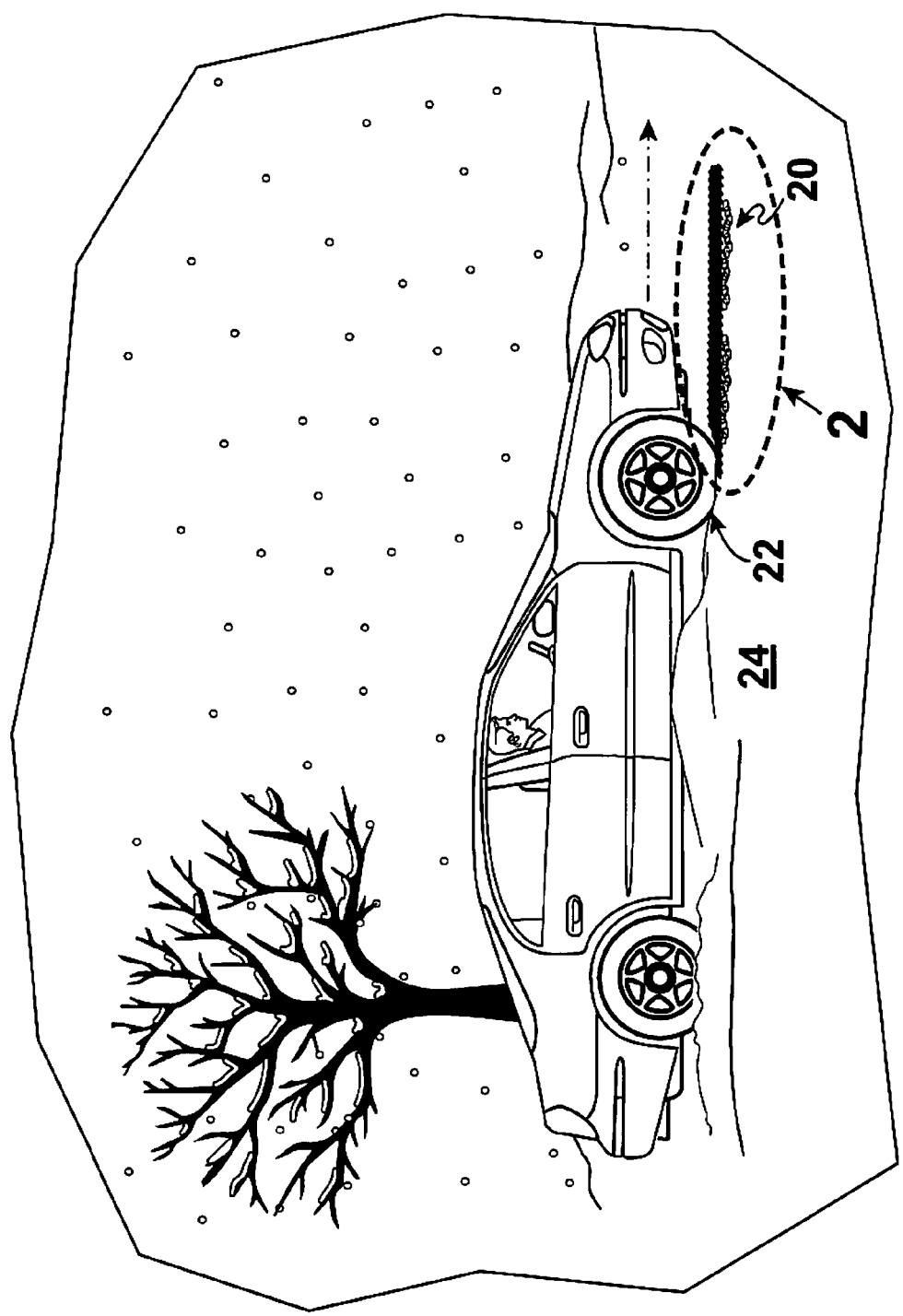
FIG. 1 is a diagrammatic perspective view showing an embodiment of the invention, enclosed in the dotted curve indicated by arrow 2, being utilized to increase traction under the front driving wheel of a vehicle.
Figure 2:
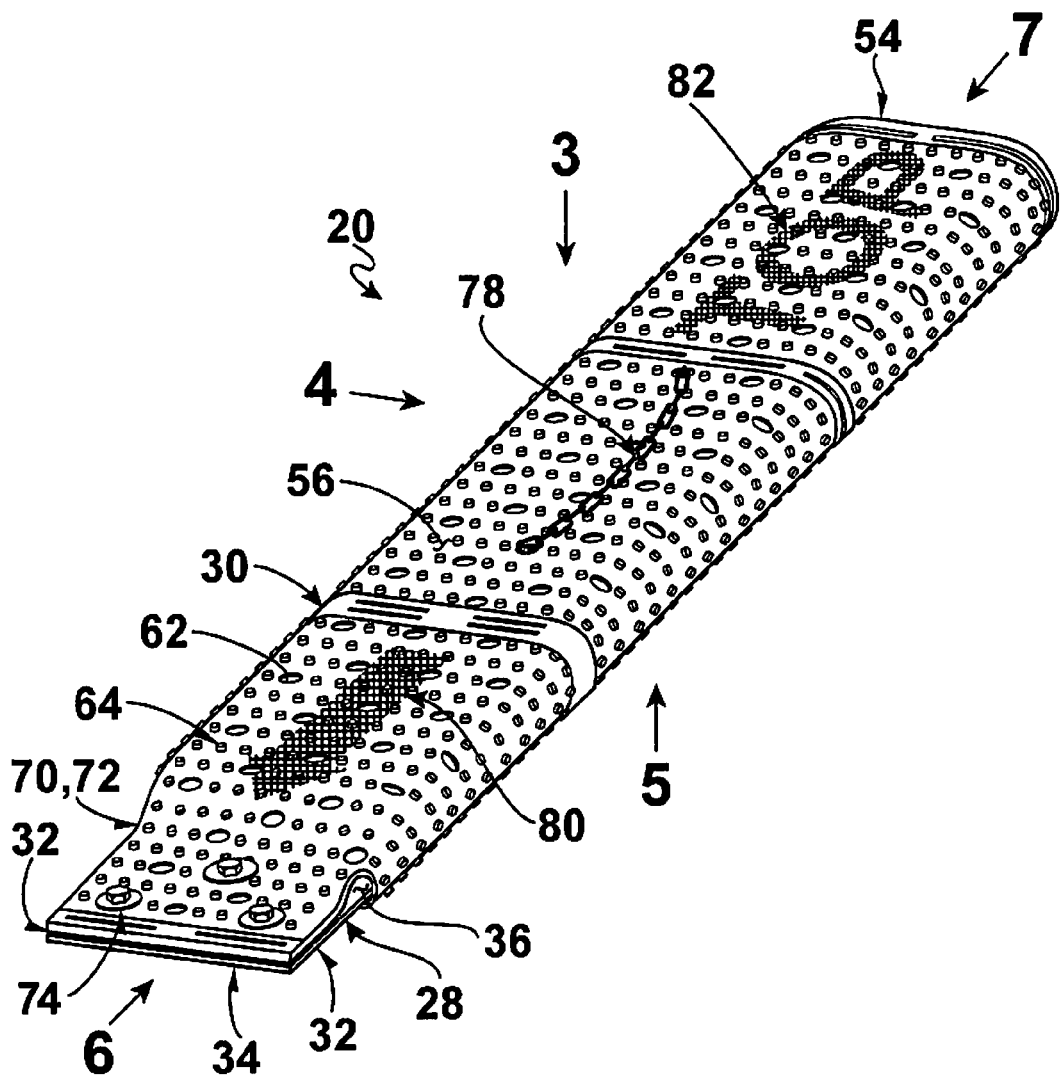
FIG. 2 is a diagrammatic perspective view of an embodiment of the invention per se.
Figure 5:
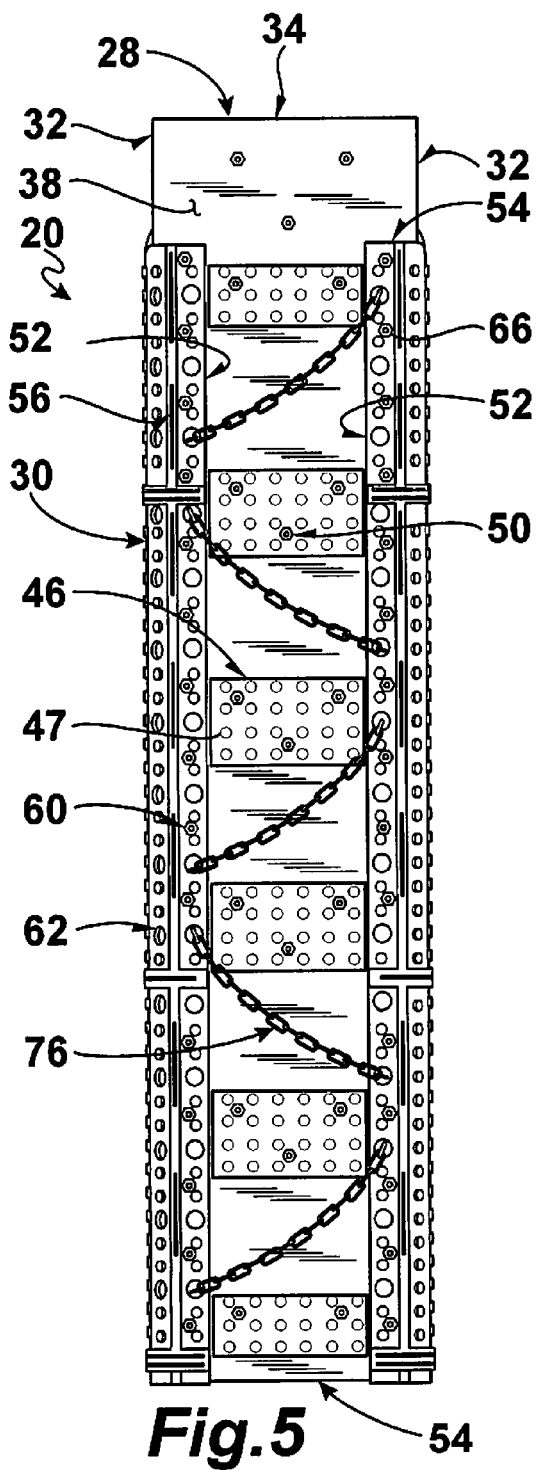
FIG. 5 is a bottom plan view thereof taken in the direction of arrow 5 in FIG. 2.
Figure 6:
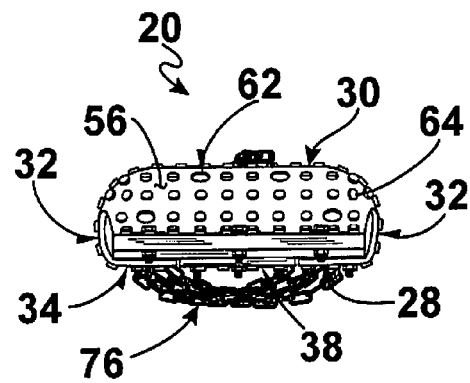
FIG. 6 is a front elevational view thereof taken in the direction of arrow 6 in FIG. 2.
Figure 7:
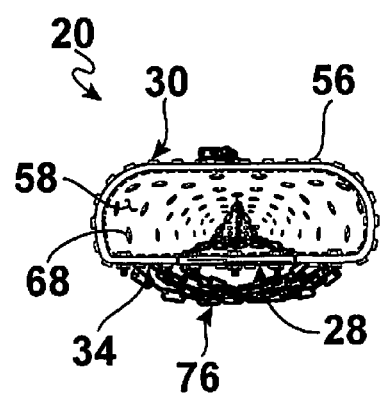
FIG. 7 is a rear elevational view thereof taken in the direction of arrow 7 in FIG. 2.
Figure 8:
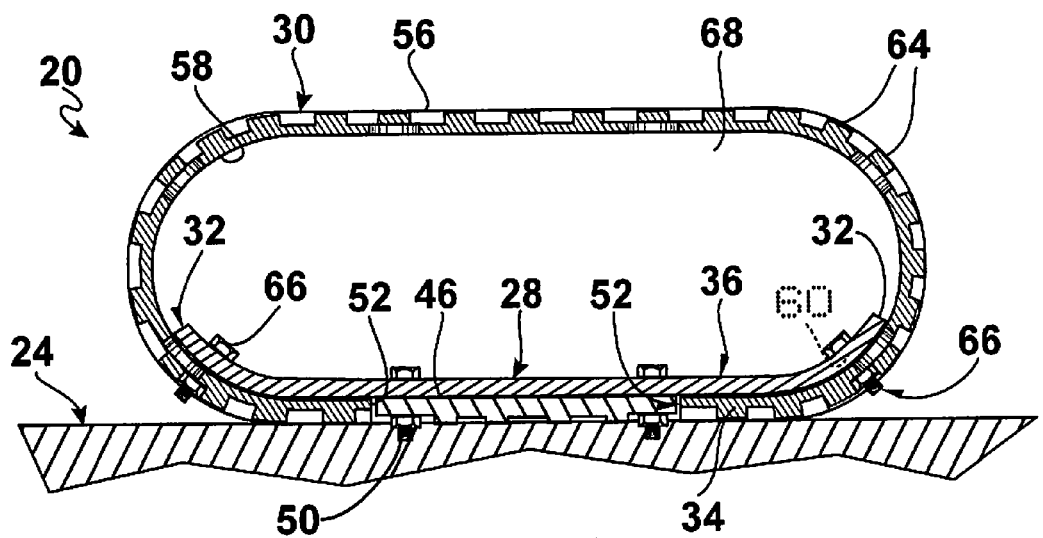
FIG. 8 is a cross sectional view thereof taken on line 8-8 in FIG. 3.

20 traction device of embodiments of present invention for providing increased traction of tire 22 having shape and being on poor tractional surface 24, for cupping to shape of tire 22, and for widening under tire 22 by compression 25 to increase surface area 26 engaging poor tractional surface 24 to increase weight distribution for increased traction of tire 22 on poor tractional surface 24
22 tire
24 poor tractional surface
25 compression
26 surface area Configuration of Traction Device 20

28 base
30 top cover for widening under, and for cupping to shape of, tire 22 by compression 25 to increase surface area 26 engaging poor tractional surface 24 to increase weight distribution for increased traction of tire 22 on poor tractional surface 24

Specific Configuration of Base 28

32 pair of long sides of base 28
34 pair of short sides of base 28
36 upper surface of base 28
38 lower surface of base 28
40 first plurality of through bores of base 28
42 second plurality of through bores of base 28
44 groups of second plurality of through bores 42 of base 28
46 plurality of traction blocks of base 28 for increased traction of tire 22 on poor tractional surface 24
47 nubs of plurality of traction blocks 46 of base 28 for increased traction of tire 22 on poor tractional surface
48 groups of through bores of plurality of traction blocks 46 of base 28
50 first plurality of nuts and bolts of base 28 for increased traction of tire 22 on poor tractional surface 24

Specific Configuration of Top Cover 30

52 pair of long sides of top cover 30
54 pair of short sides of top cover 30
56 outer surface of top cover 30
58 inner surface of top cover 30
60 first plurality of through bores of top cover 30
62 second plurality of through bores of top cover 30

64 nubs of top cover 30 for increased traction of tire 22 on poor tractional surface 24
66 first plurality of nuts and bolts of top cover 30
68 vertical compression space
70 tab of top cover 30
72 ramp
74 first plurality of nuts, washers, and bolts of tab 70 of top cover 30 for increasing traction of tire 22 on poor tractional surface 24

Miscellaneous 76 plurality of endless chains
78 endless chain handle for facilitating carrying traction device 20
80 arrow indica for pointing to ramp 72 for utilitarian purpose of alerting user which end of traction device 20 is to be placed under tire 22
82 top indica for utilitarian purpose of alerting user which surface of traction device 20 is to be placed upwardly

DETAILED DESCRIPTION OF THE PREFERRED EMBODIMENT

Introductory

Figure 9:
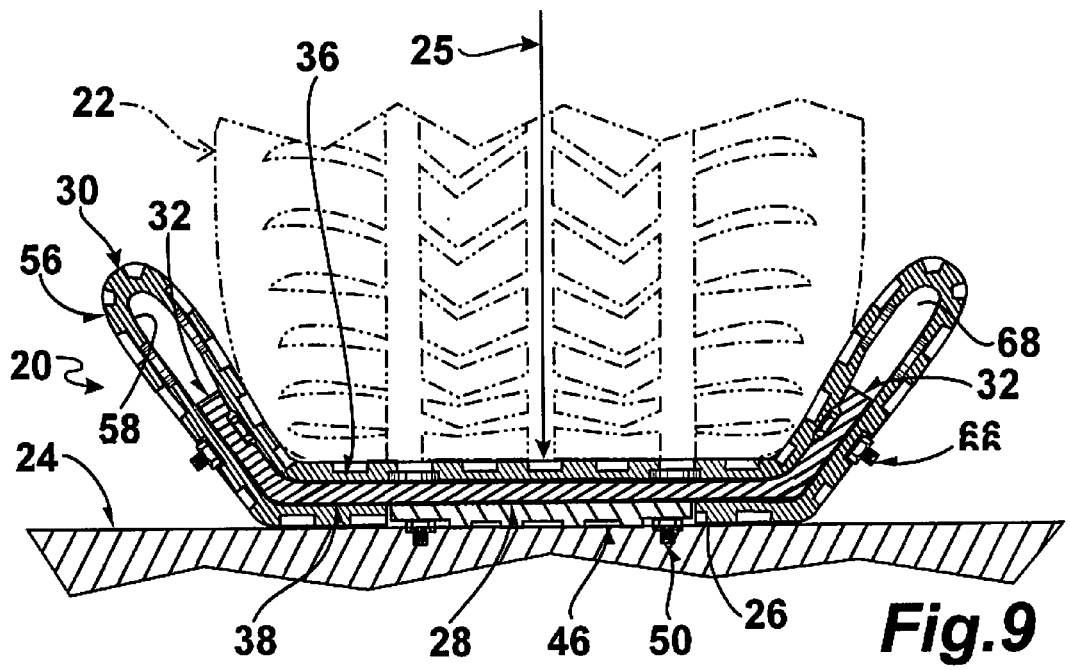
FIG. 9 is a cross sectional view thereof taken on line 9-9 in FIG. 3 with the wheel of a vehicle, shown in phantom, resting thereon and compressing the traction device while simultaneously forcing the device partially into the earth below wheel.

Referring now to the figures, in which like numerals indicate like parts, and particularly to FIGS. 1 and 9, the traction device of the embodiments of the present invention is shown generally at 20 for providing increased traction of a tire 22 having a shape and being on a poor tractional surface 24 (FIG. 1), and for widening under, and for cupping to the shape of, the tire 22 by compression 25 to increase surface area 26 engaging the poor tractional surface 24 to increase weight distribution for the increased traction of the tire 22 on the poor tractional surface 24 (FIG. 9).

Configuration of the Traction Device 20

The configuration of the traction device 20 can best be seen in FIGS. 2-10, and as such, will be discussed with reference thereto.

The traction device 20 comprises a base 28, and a top cover 30. The top cover 30 is affixed to the base 28, and is for the widening under, and for cupping to the shape of, the tire 22 by the compression 25 to increase the surface area 26 engaging the poor tractional surface 24 to increase the weight distribution for the increased traction of the tire 22 on the poor tractional surface 24.

Specific Configuration of the Base 28

The base 28 is made of a flexible material, and is rectangular-shaped, and as such, has a pair of long sides 32 and a pair of short sides 34.

The base 28 further has an upper surface 36, a lower surface 38, a first plurality of through bores 40, and a second plurality of through bores 42.

The first plurality of through bores 40 of the base 28 are spaced-apart from each other, extend axially therealong, and are disposed just inward of the pair of long sides 32 of the base 28.

The second plurality of through bores 42 of the base 28 are formed into groups 44.

The groups 44 of the second plurality of through bores 42 of the base 28 are axially spaced-apart from each other, extend laterally therealong, and are disposed between the first plurality of through bores 40 of the base 28 that extend axially therealong.

The base 28 further has a plurality of traction blocks 46.

The plurality of traction blocks 46 are made of a flexible material with nubs 47 extending therefrom for the increased traction, are axially spaced-apart from each other, extend laterally therealong, are disposed on the lower surface 38 of the base 28, over the groups 44 of the second plurality of through bores 42 of the base 28, respectively, and are for the increased traction of the tire 22 on the poor tractional surface 24.

The plurality of traction blocks 46 of the base 28 have groups of through bores 48, respectively.

The groups of through bores 48 of the plurality of traction blocks 46 of the base 28 align with the groups 44 of the second plurality of through bores 42 of the base 28, respectively.

The base 28 further has a first plurality of nuts and bolts 50.

The bolts of the first plurality of nuts and bolts 50 of the base 28 pass through the groups 44 of the second plurality of through bores 42 of the base 28, from the upper surface 36 of the base 28, and through the aligned groups of through bores 48 of the plurality of traction blocks 46 of the base 28, respectively, where nuts of the first plurality of nuts and bolts 50 of the base 28 engage the bolts of the first plurality of nuts and bolts 50 of the base 28 to affix the plurality of traction blocks 46 of the base 28 to the lower surface 38 of the base 28, with the nubs 47 of the plurality of traction blocks 46 of the base 28 facing downwardly for the increased traction.

Specific Configuration of the Top Cover 30

The top cover 30 is made of a flexible material, and is rectangular-shaped prior to attachment to the base 28, and as such, has a pair of long sides 52 and a pair of short sides 54.

The top cover 30 further has an outer surface 56, an inner surface 58, a first plurality of through bores 60, and a second plurality of through bores 62.

The first plurality of through bores 60 of the top cover 30 are spaced-apart from each other, extend axially therealong, and are disposed just inward of the pair of long sides 52 of the top cover 30.

The second plurality of through bores 62 of the top cover 30 are spaced-apart from each other, and are disposed inwardly of the first plurality of through bores 60 of, and throughout, the top cover 30.

The top cover 30 further has nubs 64.

The nubs 64 of the top cover 30 extend from the outer surface 56 of the top cover 30 and are for the increased traction of the tire 22 on the poor tractional surface 24.

The first plurality of through bores 60 of the top cover 30 are aligned with the first plurality of through bores 40 of the base 28.

The top cover 30 further has a first plurality of nuts and bolts 66.

The bolts of the first plurality of nuts and bolts 66 of the top cover 30 pass through the first plurality of through bores 40 of the base 28, from the upper surface 36 of the base 28, and through the aligned first plurality of through bores 60 of the top cover 30, respectively, where nuts of the first plurality of nuts and bolts 66 of the top cover 30 engage the bolts of the first plurality of nuts and bolts 66 of the top cover 30 to affix the top cover 30 to the base 28, with the base 28 extending past a short side 54 of the top cover 30, and with the top cover 30 forming a vertical compression space 68 with the base 28, and when driven upon by the tire 22, the top cover 30 widens under, and cups to the shape of, the tire 22 by the compression 25 of the vertical compression space 68 to increase the surface area 26 engaging the poor tractional surface 24 to increase the weight distribution for the increased traction of the tire 22 on the poor tractional surface 24.

The top cover 30 further has a tab 70.

The tab 70 of the top cover 30 extends from, is narrower than, and is one-piece with, the short side 44 of the top cover 30.

The tab 70 of the top cover 30 mates with the base 28, at a short side 34 of the base 28, so as to form a ramp 72 by virtue of the tab 70 of the top cover 30 being more flexible than the base 28.

The tab 70 of the top cover 30 is mated with the base 28 by a second plurality of nuts, washers, and bolts 74.

The bolts of the first plurality of nuts, washers, and bolts 74 of the tab 70 of the top cover 30 pass through the tab 70 of the top cover 30 and through the base 28, where nuts of the first plurality of nuts, washers, and bolts 74 of the tab 70 of the top cover 30 engage the bolts of the first plurality of nuts, washers, and bolts 74 of the tab 74 of the top cover 30 to affix the tab 70 of the top cover 30 to the base 28 while increasing the traction of the tire 22 on the poor tractional surface 24.

Miscellaneous

The traction device 20 further comprises a plurality of endless chains 76.

The plurality of endless chains 76 are separate from each other, extend continuously through diagonally opposed pairs of the first plurality of through bores 40 of the base 28 and continuously through pairs of the first plurality of through bores 60 of the top cover 30 that are aligned with the diagonally opposed pairs of the first plurality of through bores 40 of the base 28, are disposed between adjacent pairs of the traction blocks 46 of the base 28, respectively, and are for the increased traction of the tire 22 on the poor tractional surface 24.

The traction device 20 further comprises an endless chain handle 78.

The endless chain handle 78 extends continuously through a pair of spaced-apart second through bores 62 of the top cover 30, centrally of the top cover 30, and is for facilitating carrying the traction device 20.

The traction device 20 further comprises arrow indica 80.

The arrow indica 80 is associated with the top cover 30 for pointing to the ramp 72 for the utilitarian purpose of alerting a user which end of the traction device 20 is to be placed under the tire 22.[1]

[1] See in re Miller, 164 USPQ 46, 49 (CCPA 1969) ("When the printed matter is associated with a structural article for some utilitarian purpose, the fact that printed matter by itself is not patentable subject matter, because non-statutory, is no reason for ignoring it when the claim is directed to a combination." [Emphasis added]); and In re Bernhart and Fetter, 163 USPQ 611 (CCPA 1969) ("[E]ven though certain items are nonstatutory by themselves, it is proper to include them and rely on them for novelty and unobviousness if combined with other items which are in the statutory class [even though] the other 'items' may all be old." [Emphasis added]).

The traction device 20 further comprises top indica 82.

The top indica 82 is associated with the top cover 30 for the utilitarian purpose of alerting a user which surface of the traction device 20 is to be placed upwardly.[2]

[2] Id.

Impressions

It will be understood that each of the elements described above, or two or more together, may also find a useful application in other types of constructions differing from the types described above.

While the invention has been illustrated and described as embodiments of a compressible traction device, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A traction device for providing increased traction of a tire having a shape and being on a poor tractional surface, and for widening under, and cupping to the shape of, the tire by compression to increase surface area engaging the poor tractional surface to increase weight distribution for the increased traction of the tire, said traction device comprising:
  a) a base;
  b) a top cover; and
  c) a plurality of endless chains;
  wherein said top cover is affixed to said base;
  wherein said top cover is for the widening under, and the cupping to the shape of, the tire by the compression to increase said surface area engaging the poor tractional surface to increase the weight distribution for the increased traction of the tire;
  wherein said base has a pair of long sides;
  wherein said base has an upper surface;
  wherein said base has a lower surface;
  wherein said base has a first plurality of through bores;
  wherein said base has a second plurality of through bores;
  wherein said second plurality of through bores of said base are formed into groups;
  wherein said base has a plurality of traction blocks;
  wherein said traction blocks of said base are for the increased traction of the tire on the poor tractional surface;
  wherein said top cover has an outer surface;
  wherein said top cover has a first plurality of through bores;
  wherein said plurality of endless chains are for the increased traction of the tire on the poor tractional surface; and
  wherein said plurality of endless chains extend continuously through diagonally opposed pairs of the first plurality of through bores of said base and continuously through pairs of said first plurality of through bores of the top cover that are aligned with said diagonally opposed pairs of said first plurality of through bores of said base.

2. The traction device of claim 1, wherein said base is made of a flexible material.

3. The traction device of claim 1, wherein said base is rectangular-shaped.

4. The traction device of claim 1, wherein said base has a pair of short sides.

5. The traction device of claim 4, wherein said top cover has a pair of short sides.

6. The traction device of claim 5, wherein said top cover has a tab.

7. The traction device of claim 6, wherein said tab of said top cover extends from said short side of said top cover.

8. The traction device of claim 6, wherein said tab of said top cover is narrower than said short side of said top cover.

9. The traction device of claim 6, wherein said tab of said top cover is one-piece with said short side of said top cover.

10. The traction device of claim 6, wherein said tab of said top cover mates with said base so as to form a ramp by virtue of said tab of said top cover being more flexible than said base.

11. The traction device of claim 10, further comprising arrow indicia.

12. The traction device of claim 11, wherein said arrow indicia is associated with said top cover for pointing to said ramp for the utilitarian purpose of alerting a user which end of said traction device is to be placed under the tire.

13. The traction device of claim 6, wherein said tab of said top cover mates with said base at a short side of said base.

14. The traction device of claim 6, wherein said tab of said top cover is mated with said base by a first plurality of nuts, washers, and bolts.

15. The traction device of claim 14, wherein bolts of said first plurality of nuts, washers, and bolts of said tab of said top cover pass through said tab of said top cover and through said base, where nuts of said first plurality of nuts, washers, and bolts of said tab of said top cover engage said bolts of said first plurality of nuts, washers, and bolts of said tab of said top cover to affix said tab of said top cover to said base while increasing the traction of the tire on the poor tractional surface.

16. The traction device of claim 5, wherein said base extends past a short side of said top cover.

17. The traction device of claim 1, wherein said first plurality of through bores of said base are spaced-apart from each other.

18. The traction device of claim 1, wherein said first plurality of through bores of said base extend axially therealong.

19. The traction device of claim 1, wherein said first plurality of through bores of said base are disposed just inward of said pair of long sides of said base.

20. The traction device of claim 1, wherein said groups of said second plurality of through bores of said base are axially spaced-apart from each other.

21. The traction device of claim 1, wherein said groups of said second plurality of through bores of said base extend laterally therealong.

22. The traction device of claim 1, wherein said groups of said second plurality of through bores of said base are disposed between said pair of long sides of said base.

23. The traction device of claim 1, wherein said groups of said second plurality of through bores of said base are disposed between said first plurality of through bores of said base that extend axially therealong.

24. The traction device of claim 1, wherein said plurality of traction blocks of said base are made of a flexible material.

25. The traction device of claim 1, wherein said plurality of traction blocks of said base have nubs extending therefrom for increased traction.

26. The traction device of claim 25, wherein said nubs of said plurality of traction blocks of said base face downwardly for increasing traction.

27. The traction device of claim 1, wherein said plurality of traction blocks of said base are axially spaced-apart from each other.

28. The traction device of claim 1, wherein said plurality of traction blocks of said base extend laterally therealong.

29. The traction device of claim 1, wherein said plurality of traction blocks of said base are disposed on said lower surface of said base.

30. The traction device of claim 1, wherein said plurality of traction blocks of said base are disposed over said groups of said second plurality of through bores of said base, respectively.

31. The traction device of claim 1, wherein said plurality of traction blocks of said base have groups of through bores, respectively.

32. The traction device of claim 31, wherein said groups of through bores of said plurality of traction blocks of said base align with said groups of said second plurality of through bores of said base, respectively.

33. The traction device of claim 31, wherein said base has a first plurality of nuts and bolts.

34. The traction device of claim 33, wherein said bolts of said first plurality of nuts and bolts of said base pass through said groups of said second plurality of through bores of said base and through said aligned groups of through bores of said plurality of traction blocks of said base, respectively, where nuts of said first plurality of nuts and bolts of said base engage said bolts of said first plurality of nuts and bolts of said base to affix said plurality of traction blocks of said base to said lower surface of said base.

35. The traction device of claim 33, wherein said bolts of said first plurality of nuts and bolts of said base pass through said groups of said second plurality of through bores of said base from said upper surface of said base.

36. The traction device of claim 1, wherein said top cover is made of a flexible material.

37. The traction device of claim 1, wherein said top cover is rectangular-shaped prior to attachment to said base.

38. The traction device of claim 1, wherein said top cover has a pair of long sides.

39. The traction device of claim 1, wherein said top cover has an inner surface.

40. The traction device of claim 1, wherein said top cover has a second plurality of through bores.

41. The traction device of claim 40, wherein said second plurality of through bores of said top cover are spaced-apart from each other.

42. The traction device of claim 40, wherein said second plurality of through bores of said top cover are disposed inwardly of said first plurality of through bores of, and throughout, said top cover.

43. The traction device of claim 40, further comprising an endless chain handle.

44. The traction device of claim 43, wherein said endless chain handle extends through a pair of spaced-apart second through bores of said top cover; and wherein said endless chain handle is for facilitating carrying said traction device.

45. The traction device of claim 43, wherein said endless chain handle extends continuously through a pair of spaced-apart second through bores of said top cover.

46. The traction device of claim 43, wherein said endless chain handle is disposed centrally of said top cover.

47. The traction device of claim 1, wherein said first plurality of through bores of said top cover are spaced-apart from each other.

48. The traction device of claim 1, wherein said first plurality of through bores of said top cover extend axially therealong.

49. The traction device of claim 1, wherein said first plurality of through bores of said base are disposed just inward of said pair of long sides of said top cover.

50. The traction device of claim 1, wherein said top cover has nubs.

51. The traction device of claim 50, wherein said nubs of said top cover extend from said outer surface of said top cover; and wherein said nubs of said top cover are for the increased traction of the tire on the poor tractional surface.

52. The traction device of claim 1, wherein said first plurality of through bores of said top cover are aligned with said first plurality of through bores of said base.

53. The traction device of claim 1, wherein said top cover has a first plurality of nuts and bolts.

54. The traction device of claim 53, wherein bolts of said first plurality of nuts and bolts of said top cover pass through said first plurality of through bores of said base.

55. The traction device of claim 53, wherein said bolts of said first plurality of nuts and bolts of said top cover pass through said first plurality of through bores of said base from said upper surface of said base.

56. The traction device of claim 1, wherein said top cover forms a vertical compression space with said base, and when driven upon by the tire, said top cover widens under, and cups to the shape of, the tire by the compression of said compression space to increase the surface area engaging the poor tractional surface to increase the weight distribution for the increased traction of the tire on the poor tractional surface.

57. The traction device of claim 1, wherein said plurality of endless chains are separate from each other.

58. The traction device of claim 1, wherein said plurality of endless chains are disposed between adjacent pairs of said traction blocks of said base, respectively.

59. The traction device of claim 1, further comprising top indica.

60. The traction device of claim 59, wherein said top indica is associated with said top cover for the utilitarian purpose of alerting a user which surface of said traction device is to be placed upwardly.

* * * * *